Figure 1:
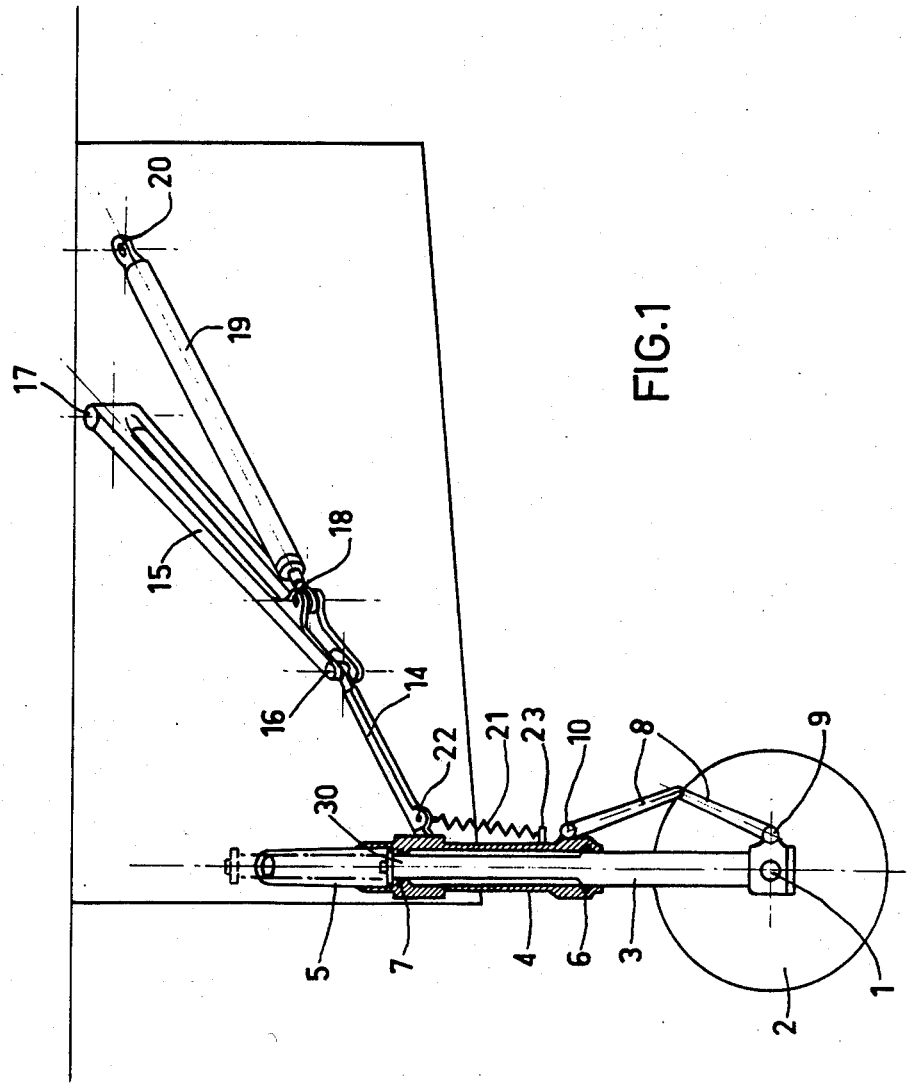

United States Patent [19]

Masclet

[11] 4,063,698
[45] Dec. 20, 1977

[54] LANDING GEAR FOR AN AERODYNE

[75] Inventor: Jean Masclet, Paris, France

[73] Assignee: Messier-Hispano, S. A., Montrouge, France

[21] Appl. No.: 742,241

[22] Filed: Nov. 16, 1976

[30] Foreign Application Priority Data

Nov. 21, 1975 France .............................. 75.35576

[51] Int. Cl.² ............................................ B64C 25/12
[52] U.S. Cl. ............................................. 244/102 R
[58] Field of Search ......................................... 244/102

[56] References Cited

U.S. PATENT DOCUMENTS

| 2,437,135 | 3/1948 | Steinhoff et al. | 244/102 R |
| 2,559,451 | 7/1951 | McBrearty | 244/102 R |
| 2,959,381 | 11/1960 | Hartel | 244/102 R |
| 2,960,288 | 11/1960 | Hartel | 244/102 R |
| 3,083,937 | 4/1963 | Bainbridge et al. | 244/102 R |
| 3,951,361 | 4/1976 | Hrusch | 244/102 R |

Primary Examiner—Galen L. Barefoot
Attorney, Agent, or Firm—Scully, Scott, Murphy & Presser

[57] ABSTRACT

A landing gear for an aerodyne which is raised towards the rear of the aerodyne, including a structural member with a shock absorber for each undercarriage and connected to at least one wheel, and at least one truss actuating jack operative to employ aerodynamic forces opposing the lowering of the undercarriages to aid in the locking of the truss actuating jack and thus the undercarriages in the landing gear down position.

3 Claims, 5 Drawing Figures

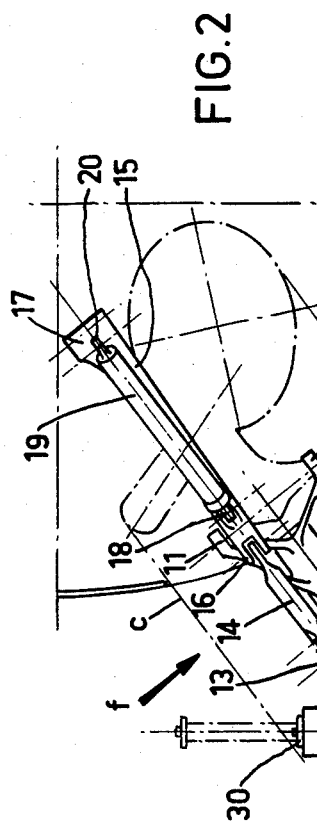
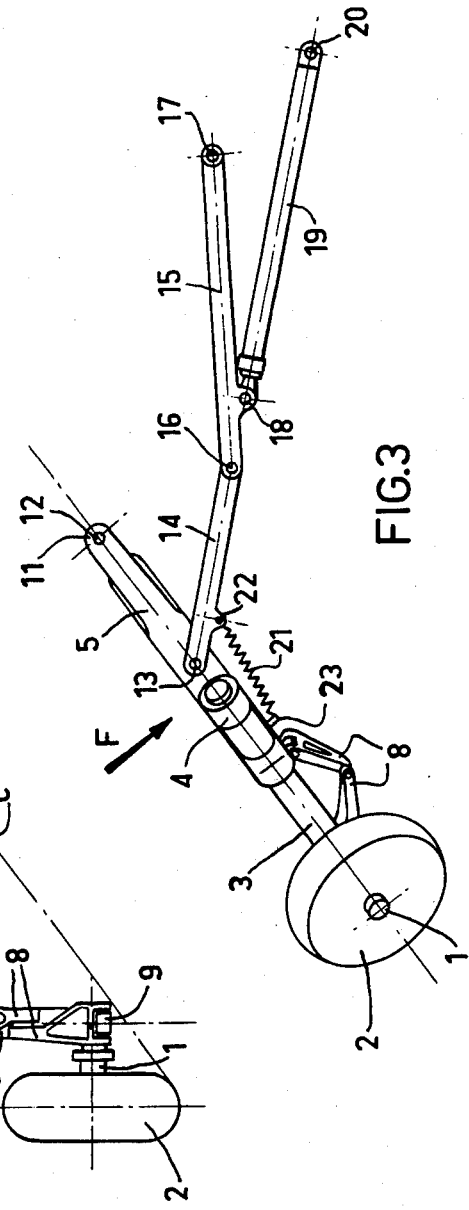
FIG.2
FIG.3

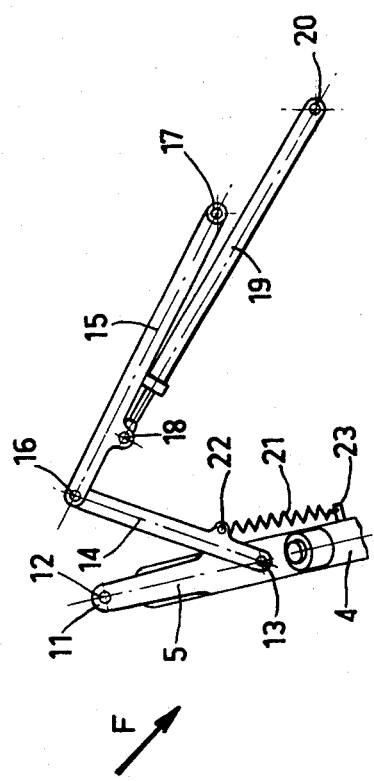
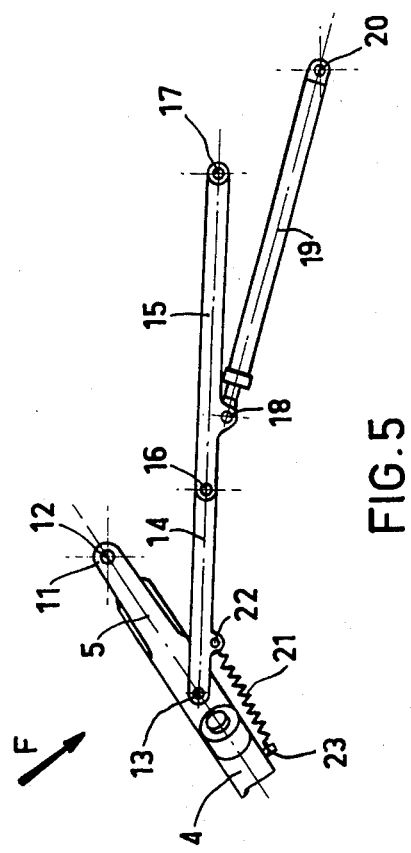

LANDING GEAR FOR AN AERODYNE

The object of the present invention is improvements made to landing gears for aerodynes and more particularly to fuselage landing gears such as those used, for example, on certain aircraft and helicopters.

When it is impossible to fix undercarriages beneath the wings of an aircraft, because the latter are for example too high, have a variable geometry or rotate, it is necessary to use fuselage gears, that is to say gears such that the main undercarriages are articulated to the fuselage, whereby at least one of the wheels of each of the main undercarriages is in the "undercarriage down" position, overhanging relative to the articulation axis of the undercarriage on the fuselage, in such a way as to obtain a sufficient travel to ensure a good stability of the aerodyne.

In addition, said articulation axis can be suitably inclined in such a way that the wheel or wheels of the undercarriages can be retracted into the fuselage.

Undercarriages are already known which are of the sliding type, i.e. such that the shock absorbing travel on impact during the landing of the aerodyne takes place by the sliding of a rod within a vertical or substantially vertical body. In this case, the undercarriage necessarily has a break between said vertical body and the structural part of the undercarriage connecting said body to the oblique articulation axis, said break making it necessary for a large opening to be made in the fuselage for the passage of the undercarriage during the retraction of the latter.

Undercarriages of this type can be braced by means of offset struts, whose arms in the "landing gear down" position are aligned and kept aligned by at least one jack having internal locking devices.

In the case where the landing gear is mounted in such a way that the undercarriages are lifted in the rearward direction, the lowering of the latter generally takes place counter to the aerodynamic forces and, as a result of a hydraulic breakdown or for any other reason which removes the assistance of the jack, an emergency lowering can only take place if, to the mass motive stresses (due to the weight of the different components of the undercarriage) is added the effect of a very poweful compensating device, which can be for example mechanical or pneumatic, in order to permit the locking of the undercarriage in the "landing gear down" position, in view of the aerodynamic forces and drag load of the internal locking device of the jack.

The object of the present invention is substantially a landing gear for an aerodyne which is raised towards the rear of the aerodyne, comprising for each undercarriage a structural member associated with shock absorber means connected to at least one wheel, said structural member being mounted so as to pivot on the aerodyne about an articulation axis and cooperating with an offset strut and a truss actuating jack equipped with at least one internal locking device, characterized in that the offset strut comprises an arm and a rod articulated to one another by one of their ends, the said arm being also articulated by its other end to a fixed point on the aerodyne and the rod also being articulated by the other end to a fixed point of the structural member, the truss actuating jack being articulated on the one hand to the arm at a fixed point of the latter and on the other hand to a fixed point of the aerodyne, whereby in the landing gear down position, said jack is substantially aligned with the said rod in such a way that the aerodynamic forces which oppose the lowering of the undercarriages are used to aid the locking of the truss actuating jack and consequently the undercarriages in the landing gear down position, together with the raising of the undercarriages beyond the alignment position of the rod and the arm.

According to the invention, a landing gear as defined hereinbefore can also be characterized in that low energy elastic compensating members are articulated on the one hand to the rod and on the other hand to the structural member at a fixed point of the latter located beyond the articulation point of the rod on the structural member relative to the articulation axis of the latter on the aerodyne, in such a way that the lowering and emergency locking of the landing gear, without hydraulic aid, can takeplace solely under the action of the mass forces of the various components of the undercarriage, the aerodynamic forces and the loads of said elastic compensating members.

The present invention relates more particularly to a fuselage landing gear having the above characteristics and which is characterized in that the articulation axis on the fuselage is oblique and that the shock absorber means are of the sliding type, comprising a sliding rod which, in the landing gear down position, is located in the transverse plane passing through the oblique articulation axis, whereby the offset strut and the truss actuating jack are moved in a plane perpendicular to said oblique articulation axis.

A fuselage gear of this type has the advantage of reliability of emergency lowering, whilst requiring for its retraction only a smaller opening made in the aerodyne fuselage.

As a non-limitative example, a preferred embodiment of a landing gear according to the invention will be described hereinafter and illustrated relative to the drawings. This embodiment relates to a fuselage gear, whereof each undercarriage equipped with a single wheel, is articulated to the fuselage about an oblique axis, located in plane perpendicular to the longitudinal axis of the aerodyne, said plane also containing the axis of the sliding rod when the undercarriage is in the landing gear down position. Each of the undercarriages is raised rearwards and the offset strut as well as the truss actuating jack are moved in a plane perpendicular to the oblique articulation axis.

In the drawings show:

FIG. 1 a sectional view in the landing gear down position, whereby the left undercarriage of the fuselage landing gear is described as an example, the right undercarriage symmetrically corresponding thereto.

FIG. 2 the same left undercarriage, viewed from the rear, in the landing gear down position (continuous lines) and in the landing gear up position (dot-dash lines).

FIG. 3 a view following the arrow $f$ of the undercarriage shown in FIG. 2 and representing the plane containing the offset strut and the truss actuating jack.

FIGS. 4 and 5 partial views in accordance with the arrow $f$ of the bracing and operating members during the lowering of the undercarriage, whereby FIG. 4 shows an intermediate position starting from the "landing gear up" position and FIG. 5 representing a special position in which two bracing members are aligned.

With reference to FIGS. 1, 2 and 3, a wheel axle 1 receiving a wheel 2 is mounted at the lower end of a rod 3, sliding in a vertical body 4 of a structural member 5 of the undercarriage via two bearings 6 and 7.

Landing gear scissors 8 are articulated on the one hand to the axle 1 by means of attachment 9 and on the other to the vertical member 4 by means of attachment 10.

The structural member 5 of the undercarriage is articulated to the fuselage of the aerodyne at fixed points of the latter by attachments 11 and 12. The structural member 5 has an attachment 13 serving as an articulation to rod 14, which is in turn articulated at its other end to an arm 15 by means of an attachment 16.

Arm 15 is articulated to the aerodyne at a fixed point of the latter by means of attachment 17 and has the attachment 18 of a truss actuating jack 19, equipped with an internal locking device and articulated to the aerodyne at a fixed point of the latter by attachment 20.

Elastic compensating members 21, for example springs, are articulated on the one hand to rod 14 by attachment 22 and on the other to the vertical member 4 by attachment 23.

In the landing gear down position, rod 14 is substantially aligned with the truss actuating jack 19 (cf particularly FIG. 3), i.e. the attachments 13, 16, 18 and 20 are substantially aligned.

The vertical member 4 and sliding rod 3 are constructed so as to define an oleopneumatic shock absorber, whereby the diameter of the upper part of sliding rod 3 is smaller than the diameter of its lower part (as shown in the sectional portion of FIG. 1) and a hydraulic liquid fills the annular shape space defined between member 4 and rod 3. Moreover, a pressurized gas is contained in a chamber provided within the rod 3 and said chamber communicates with the annular space, whereby the assembly defines a shock absorber of a known type, whose components and the respective positions thereof will not be described in greater detail, because the shock absorbing effect does not form part of the invention.

The thus described undercarriage functions in the following manner. In the landing gear down configuration under the loads coming from the ground, rod 3 slides and enters member 4 and its upper portion 30 passes out of the upper part of member 4, as shown by dot-dash lines in FIGS. 1 and 2. Due to the diameter difference between the upper and lower portions of rod 3, the hydraulic liquid is transferred from the annular space towards the inner chamber of rod 3 and compresses the gas contained therein.

To ensure the retraction of the undercarriage, a hydraulic fluid is admitted into the truss actuating jack 19 so as to bring about the extension thereof which, from the position shown in FIG. 3, has the effect of rotating arm 15 about articulation 17, as is successively shown in FIG. 5 and in FIG. 4. This then drives rod 14 and consequently brings about the pivoting of structural member 5 about the articulation axis defined by attachments 11 and 12 towards the "landing gear up" position.

It is pointed out that during a retraction and up to the position shown in FIG. 4, which is reached rapidly, the aerodynamic forces $f$ have a drag action and only become motive beyond said position i.e. during the largest part of the retraction, thus aiding the truss actuating jack.

It is shown in FIG. 2 that the envelope of the trajectories of the shock absorber members, limited by the lines $c$ and $c'$ only require a reduced opening in the fuselage, sufficient to permit the total retraction of the undercarriage.

To ensure the normal lowering of the undercarriage, hydraulic fluid is admitted into jack 19 so as to bring about the shortening thereof, until it locks in the compressed position, being substantially aligned with rod 14.

In the case where the emergency lowering, without hydraulic assistance is necessary, the mass stresses bring about the rotation of structural member 5 about the articulation axis defined by attachments 11 and 12. The elastic compensating members 21 and 22 acting on rod 14 then assist the lowering of the undercarriage by opposing aerodynamic forces $f$ which tend to lengthen jack 19. Just prior to the "landing gear down" position, rod 14 becomes aligned with arm 15, attachments 13, 16 and 17 being aligned as shown in FIG. 5. Starting from this position and up to the landing gear down position shown in FIG. 3, the aerodynamic forces $f$ tend to compress jack 19 and therefore aid the locking of jack 19, corresponding to the locking of the undercarriage in the landing gear down position.

The invention, which has been described with particular reference to a fuselage landing gear also relates to all landing gears having the above operating and bracing means described in their relative positions and associated with low energy elastic compensating members.

I claim:

1. Landing gear for an aerodyne which is raised towards the rear of the aerodyne, comprising for each undercarriage a structural member associated with shock absorber means connected to at least one wheel, said structural member being mounted so as to pivot on the aerodyne about an articulation axis and cooperating with an offset strut and a truss actuating jack equipped with at least one internal locking device, characterized in that the offset strut comprises an arm and a rod articulated to one another by one of their ends, the said arm being also articulated to its other end to a fixed point on the aerodyne and the rod also being articulated by the other end to a fixed point of the structural member, the truss actuating jack being articulated on the one hand to the arm at a fixed point of the latter and on the other hand to a fixed point of the aerodyne, so that in the landing gear down position, said jack is substantially aligned with the said rod in such a way that the aerodynamic forces which oppose the lowering of the undercarriages are used to aid the locking of the truss actuating jack and consequently the undercarriages in the landing gear down position, together with the raising of the undercarriages beyond the alignment position of the rod and the arm, and low energy elastic compensating members being articulated to, respectively, the rod and to the structural member at a fixed point of the latter located beyond the articulation point of the rod on the structural member relative to the articulation axis of the latter on the aerodyne whereby the lowering and emergency locking of the landing gear, without hydraulic aid, can take place solely under the action of the mass forces of the various components of the undercarriages, the aerodynamic forces and the loads of said elastic compensating members.

2. Fuselage landing gear according to claim 1, characterized in that said articulation axis on the fuselage is oblique and the shock absorber means are of the sliding type comprising a sliding rod located in the transverse plane passing through the oblique articulation axis, whereby the offset strut and the truss actuating jack move in a plane perpendicular to said oblique articulation axis.

3. Landing gear for an aerodyne which is raised towards the rear of the aerodyne, comprising for each undercarriage a structural member associated with shock absorber means connected to at least one wheel, said structural member being mounted so as to pivot on the aerodyne about an articulation axis and cooperating with an offset strut and a truss actuating jack equipped with at least one internal locking device, characterized in that the offset strut comprises an arm and a rod articulated to one another by one of their ends, the said arm being also articulated to its other end to a fixed point on the aerodyne and the rod also being articulated by the other end to a fixed point of the structural member, the truss actuating jack being articulated on the one hand to the arm at a fixed point of the latter and on the other hand to a fixed point of the aerodyne, whereby in the landing gear down position said jack is substantially aligned with the said rod in a generally coaxial relationship so that the aerodynamic forces which oppose the lowering of the undercarriages are used to aid the locking of the truss actuating jack and consequently the undercarriages in the landing gear down position, together with the raising of the undercarriages beyond the alignment position of the rod and the arm, the latter of which form a rigid, generally unitary structure in said landing gear down position.

* * * * *